United States Patent
Bouvrette et al.

(10) Patent No.: US 12,044,547 B1
(45) Date of Patent: Jul. 23, 2024

(54) TECHNIQUE FOR ALIGNMENT OF A MOBILE DEVICE ORIENTATION SENSOR WITH THE EARTH'S COORDINATE SYSTEM

(71) Applicant: Bentley Systems, Incorporated, Exton, PA (US)

(72) Inventors: Marc-André Bouvrette, Québec (CA); Stéphane Côté, Lac Beauport (CA)

(73) Assignee: Bentley Systems, Incorporated, Exton, PA (US)

( * ) Notice: Subject to any disclaimer, the term of this patent is extended or adjusted under 35 U.S.C. 154(b) by 213 days.

(21) Appl. No.: 16/298,410

(22) Filed: Mar. 11, 2019

(51) Int. Cl.
| | |
|---|---|
| G01C 21/00 | (2006.01) |
| G01C 17/00 | (2006.01) |
| G01C 21/08 | (2006.01) |
| G01C 21/16 | (2006.01) |
| G01C 25/00 | (2006.01) |
| G01S 5/00 | (2006.01) |
| G01S 19/47 | (2010.01) |
| G06F 3/01 | (2006.01) |

(52) U.S. Cl.
CPC ............. *G01C 25/00* (2013.01); *G01C 17/00* (2013.01); *G01C 21/005* (2013.01); *G01C 21/08* (2013.01); *G01C 21/16* (2013.01); *G01S 5/00* (2013.01); *G01S 19/47* (2013.01); *G06F 3/011* (2013.01)

(58) Field of Classification Search
CPC ...... G01C 25/00; G01C 21/005; G01C 21/08; G01C 17/00; G01C 21/16; G01S 19/47; G01S 5/00; G06F 3/011

USPC ....................................................... 702/150
See application file for complete search history.

(56) References Cited

U.S. PATENT DOCUMENTS

| | | | | |
|---|---|---|---|---|
| 6,587,692 | B1* | 7/2003 | Chen | G01S 1/022 342/357.29 |
| 6,912,475 | B2* | 6/2005 | Moriya | G06V 40/23 702/150 |
| 8,332,180 | B2 | 12/2012 | Partridge et al. | |
| 8,504,292 | B1 | 8/2013 | Côté et al. | |
| 9,410,809 | B2 | 8/2016 | Hogdal | |
| 9,881,419 | B1 | 1/2018 | Côté et al. | |
| 2009/0309759 | A1* | 12/2009 | Williams | G08G 1/14 340/932.2 |
| 2010/0076720 | A1 | 3/2010 | Mori et al. | |

(Continued)

*Primary Examiner* — Mi'schita' Henson
(74) *Attorney, Agent, or Firm* — Cesari and McKenna, LLP; James A. Blanchette

(57) ABSTRACT

In one embodiment, a technique for providing absolute orientation of a mobile device involves aligning the orientation sensor of the mobile device with the Earth's coordinate system. An initial orientation from the orientation sensor of the mobile device is accessed, a user is prompted to move the mobile device in a direction of the initial orientation, and using a position sensor, a set of position information that describes positions of the mobile device is captured while the mobile device is being moved in the direction. Based on the set of position information, a vector of movement is determined. Using the vector of movement, an orientation difference is calculated between the Earth's coordinate system and a coordinate system of the mobile device. Upon demand, an absolute orientation of the mobile device may be produced by accessing a live orientation from the orientation sensor and adding the orientation difference.

22 Claims, 8 Drawing Sheets

(56) References Cited

U.S. PATENT DOCUMENTS

| | | | |
|---|---|---|---|
| 2013/0038634 A1* | 2/2013 | Yamada | G09G 5/00 |
| | | | 345/649 |
| 2013/0040653 A1* | 2/2013 | Czompo | G01C 21/165 |
| | | | 455/456.1 |
| 2013/0096817 A1* | 4/2013 | Fauci | H04W 4/029 |
| | | | 701/411 |
| 2013/0237256 A1* | 9/2013 | Naka | H04W 4/029 |
| | | | 455/457 |
| 2014/0009499 A1* | 1/2014 | Gardenfors | G06F 1/1626 |
| | | | 345/656 |
| 2014/0129170 A1* | 5/2014 | Ramachandran | G01P 21/00 |
| | | | 702/93 |
| 2014/0247279 A1 | 9/2014 | Nicholas et al. | |
| 2015/0103183 A1 | 4/2015 | Abbott et al. | |
| 2017/0178364 A1* | 6/2017 | Needham | G06T 19/006 |
| 2018/0255528 A1* | 9/2018 | Ronen | G01S 5/0252 |
| 2018/0365883 A1* | 12/2018 | Fillhardt | G06T 19/006 |

* cited by examiner

TECHNIQUE FOR ALIGNMENT OF A MOBILE DEVICE ORIENTATION SENSOR WITH THE EARTH'S COORDINATE SYSTEM

BACKGROUND

Technical Field

The present disclosure relates to orientation determination and more specifically to techniques for determining an accurate absolute orientation of a mobile device.

Background Information

Augmented reality is a useful tool in a variety of infrastructure planning, construction and maintenance tasks. It has the potential to decrease planning time requirements, while also minimizing mistakes and increasing safety. However, a number of technical challenges have limited its widespread adoption.

In traditional augmented reality, a live view of the physical environment is augmented. An augmented reality application executing on a mobile device (e.g., a head-mounted display unit, tablet computer, smartphone, etc.) uses a camera of the device to capture a live view of the physical environment (e.g., as a stream of images). A position sensor (e.g., a global positioning system (GPS) receiver) determines a position of the mobile device and an orientation sensor determines an orientation of the mobile device. Based on the position and orientation, the augmented reality application may align information (e.g., a three-dimensional (3-D) model or two-dimensional (2-D) drawing, such as a 2-D map) that describes features with view of the physical environment, and augments the view the physical environment based thereon, adding virtual features that supplement the physical features displayed in the view.

In some more recent augmented reality applications, rather than augment a live view of the physical environment, a pre-generated, physical environment-aligned 3D reality mesh is instead augmented. In this context, a 3-D reality mesh refers to a 3-D polygon mesh constructed from pre-captured images of the physical environment, for example, by structure-from-motion (SfM) photogrammetry. In this variant of augmented reality, the augmented reality application loads a 3D reality mesh on the mobile device. A position sensor (e.g., a global positioning system (GPS) receiver) determines a position of the mobile device and an orientation sensor determines an orientation of the mobile device. Based on the position and orientation, the application aligns the 3-D reality mesh with the physical environment, such that what the users sees in the 3D reality mesh corresponds with what they see in the physical environment. The application further aligns information that describes features with the 3D reality mesh, and augments the 3D reality mesh based thereon. Virtual features are added to the 3D reality mesh to supplement the original display.

In either of these variants of augmented reality, it is important to accurately determine the position and the orientation of the mobile device. Without accurate position and orientation information, augmentations may not be placed in the appropriate locations and/or a 3-D reality mesh may not be properly aligned with the physical environment. A number of technologies have been developed to attempt to obtain accurate position. However, obtaining accurate orientation still poses a significant technical challenge. This challenge may be caused by the hardware capabilities of the mobile device and/or the software configuration of the mobile device, depending one the particular device being used.

To be useful in augmented reality, orientation typically needs to be expressed as an absolute orientation, not a relative orientation. As used herein, the term "absolute orientation" refers to an orientation defined relative to the Earth itself. An absolute orientation is an orientation in the Earth's coordinate system. For example, an absolute orientation may be represented using a 3-axis coordinate system, where the x-axis is a vector product of yz that is tangential to the ground and points East, the y-axis is tangential to the ground and points towards magnetic north, and the z-axis points towards the sky and is perpendicular to the plane made up of the x and y axes. As used herein, the term "relative orientation" refers to an orientation defined relative to a portion of the mobile device itself, such as the display screen. A relative orientation is an orientation in the device's coordinate system. For example, a relative orientation may be represented using a 3-axis coordinate system, where the x-axis is horizontal and points to the right of the device's screen, the y-axis is vertical and points towards the top of the device's screen, and the z-axis points forward extending out from the device's screen.

Mobile devices typically determine orientation using an accelerometer, gyroscope, magnetometer, and/or other physical sensors. Outputs of these physical sensors may be interpreted by, and accessed through, classes and subclasses of the operating system and/or intermediary software (e.g., a web browser) which provides an application program interface (API). In some cases, the physical sensors are only capable of determining relative orientation, so the classes/subclasses and/or APIs necessarily must provide only relative orientation. In other cases, the physical sensors may be capable of determining absolute orientation, however, the classes/subclasses and/or APIs may not support the return of such absolute orientation, instead only supplying relative orientation. For example, in some versions of the Safari® and Firefox® web browsers, only relative orientation values are provided, regardless of the underlying hardware capabilities of the mobile device.

Various techniques have been attempted to address the problem of a lack of accurate orientation for mobile devices, however, each has suffered shortcomings. In some automobile-based mobile devices (e.g., GPS navigation devices), techniques have been used that combine displacement information with information describing the shape and type of roads in the surrounding area to determine orientation. For example, if displacement occurs near a road, possible orientations may be confined to the two directions along that road (or in the case of a one-way road, one direction), and such information used to resolve what may be an ambiguous orientation based on displacement alone. While useful in an automotive setting, such techniques may have limited applicability to augmented reality. To be useful, the techniques require constant displacement. An augmented reality user may desire to stay in the same place, and simply change orientation. Likewise, the techniques require road information. An augmented reality user may desire to use augmented reality in an open setting, walking freely about an area, unconfined by any sorts of paths or roads.

Other techniques have attempted to calibrate a mobile device's "compass" (or more specifically, a magnetometer in the mobile device) by moving the device in a figure-8 pattern. Such movement is used to disambiguate components of the Earths magnetic field so that all those that do not point to magnetic north (e.g., radial components) may be ignored. However, such techniques may not be adequate for augmented reality. Among other shortcomings, they are not applicable to devices that lack sensors capable of determining absolute orientation (e.g., that lack a magnetometer). Further, they are not applicable to cases where the classes/subclasses of the operating system and/or APIs of intermediary software only supply relative orientation.

Finally, certain manual techniques have been proposed, where a user manually indicates correspondence between features displayed on a display screen and features in the physical environment, and orientation is calculated therefrom. However, such manual approaches can be time consuming and burdensome on the user.

There is a need for improved techniques for determining an accurate absolute orientation of a mobile device. It would be desirable if such techniques could address some or all of the above noted problems of prior techniques.

SUMMARY

Techniques are provided for obtaining accurate absolute orientation of a mobile device by aligning an orientation (e.g., a relative orientation) from an orientation sensor of the mobile device with the Earth's coordinate system. Such techniques may be applicable to a wide variety of situations. Unlike prior techniques, they may not require constant displacement, may not utilize road information, are flexible enough to support the presence or absence of various types of physical sensors, can accommodate classes/subclasses and APIs that limit the types of orientation provided, among other possible benefits. The techniques may improve the operation of mobile devices when used with a variety of applications, such as augmented reality applications, providing both usability and performance improvements.

In one embodiment, a technique for providing absolute orientation of a mobile device involves aligning the orientation sensor of the mobile device with the Earth's coordinate system. To do so, an orientation sensor alignment software process accesses an initial orientation from the orientation sensor of the mobile device, prompts a user to move the mobile device in the direction of the initial orientation, and captures, using a position sensor of the mobile device, a set of position information that describes positions of the mobile device while the mobile device is being moved in the direction. Based on the set of position information, the orientation sensor alignment software process determines a vector of movement, for example, by performing a linear regression on the set of position information to produce an axis of movement and determining a direction along the axis of movement. Based on the vector of movement, the orientation sensor alignment software process calculates an orientation difference between the Earth's coordinate system and a coordinate system of the mobile device. Upon demand, the orientation sensor alignment software process may produce absolute orientation by accessing a live orientation from the orientation sensor and adding the orientation difference to the live orientation to produce the absolute orientation of the mobile device.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
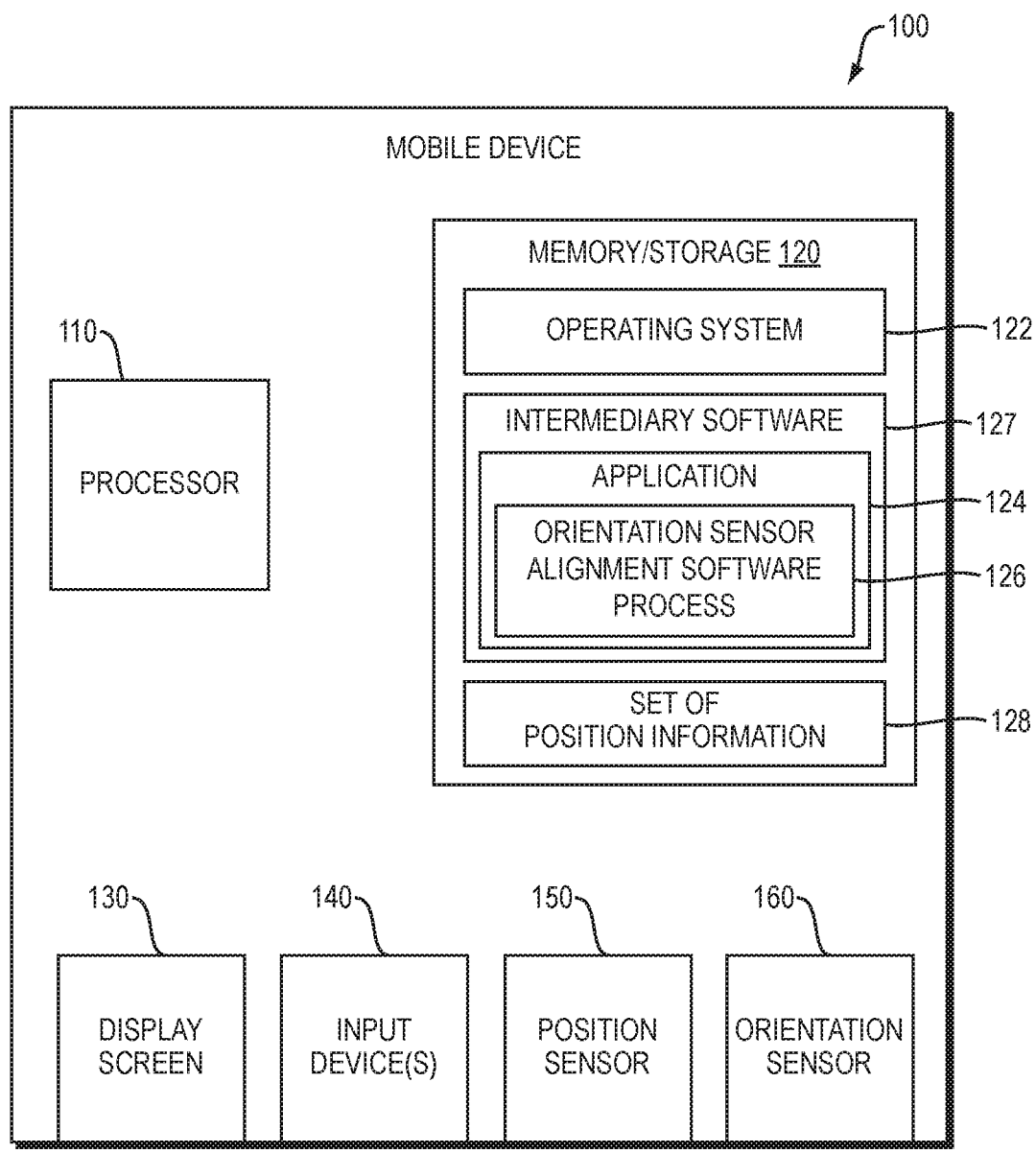
FIG. 1 is a block diagram of an example mobile device.

FIG. 1 is a block diagram of an example mobile device 100. The mobile device 100 may be stand-alone mobile device, for example a head-mounted display unit (e.g., the Microsoft HoloLens® head-mounted display unit), a tablet computer, a smartphone, etc. Alternatively, the mobile device may be part of a larger mobile system, for example, a head-up display (HUD) system integrated into a vehicle, a measurement or survey instrument, etc. The mobile device 100 includes a processor 110 coupled to volatile and non-volatile memory/storage devices 120 that, among other things, store processor-executable instructions and data. The instructions include at least instructions of an operating system 122, an application that consumes orientation of the mobile device (for example, an augmented reality application) 124 and an orientation sensor alignment software process 126 (that may be a part of the application 124, or a stand-alone piece of software). In some cases, the instructions may include instructions for intermediary software 127 (for example, a web browser or other environment) in which the application 124 executes. The data includes at least a set of position information 128.

In addition, the electronic device 100 further includes a display screen 130 (e.g., a stereoscopic optical see-through head-mounted display, a touch screen panel, a non-touch enabled liquid crystal display (LCD), etc.) configured to show user interfaces of the application 124 and orientation sensor alignment software process 126. In an implementation where orientation sensor alignment software process 126 is a part of the application 124, its user interface may be a portion of the overall user interface of the application 124. Further, at least one input device 140 (e.g., a touch sensor, keyboard, etc.) is provided to receive user selections in the user interfaces.

The mobile device 100 also includes a position sensor 150 and an orientation sensor 160. The position sensor 150 may be a GPS receiver and/or other physical sensor that together with supporting software is capable of determining a position of the mobile device. The orientation sensors 160 may include an accelerometer, gyroscope, magnetometer, and/or other physical sensors that together with supporting software are capable of determining orientation (e.g., a relative orientation or absolute orientation) of the mobile device. The orientation may be accessed via classes and subclasses of the operating system 122 and/or an API of the intermediary software (e.g., web browser) 127 by the application 124 and orientation sensor alignment software process 126. As explained above, in some cases, the orientation sensor 160 may be only able to determine relative orientation and be intrinsically incapable of determining absolute orientation. In other cases, the orientation sensor may be capable of determining absolute orientation, but the classes/subclasses of the operating system 122 and/or the API of the intermediary software 127 may provide access only to relative orientation.

It should be understood that the mobile device 100 may include a wide variety of other hardware and software components, and that the above described components are merely illustrative. Further, while it is discussed above that the mobile device 100 may take the form of a stand-alone mobile device or be a part of a larger mobile system, it should be understood that the mobile device 100 may also comprise multiple separate devices operating together. In general, a variety of distributed, collaborative, and/or remote computing arrangements are possible.

Figure 2:
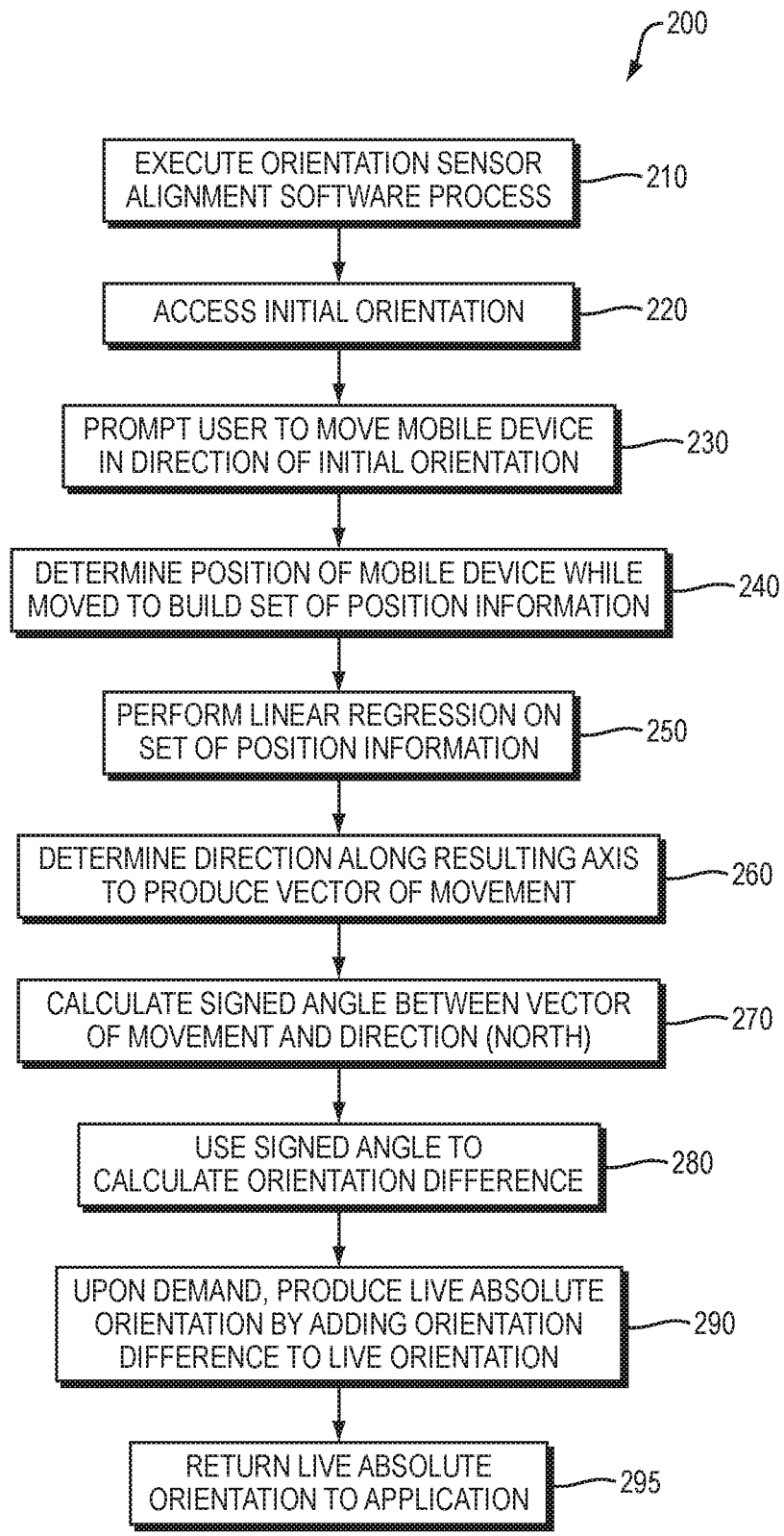
FIG. 2 is a flow diagram of an example sequence of steps for providing absolute orientation of a mobile device by aligning orientation (e.g., a relative orientation) from an orientation sensor of the mobile device with the Earth's coordinate system.

FIG. 2 is a flow diagram of an example sequence of steps 200 for providing absolute orientation of a mobile device 100 by aligning orientation (e.g., a relative orientation) from an orientation sensor 160 of the mobile device with the Earth's coordinate system.

Figure 3:
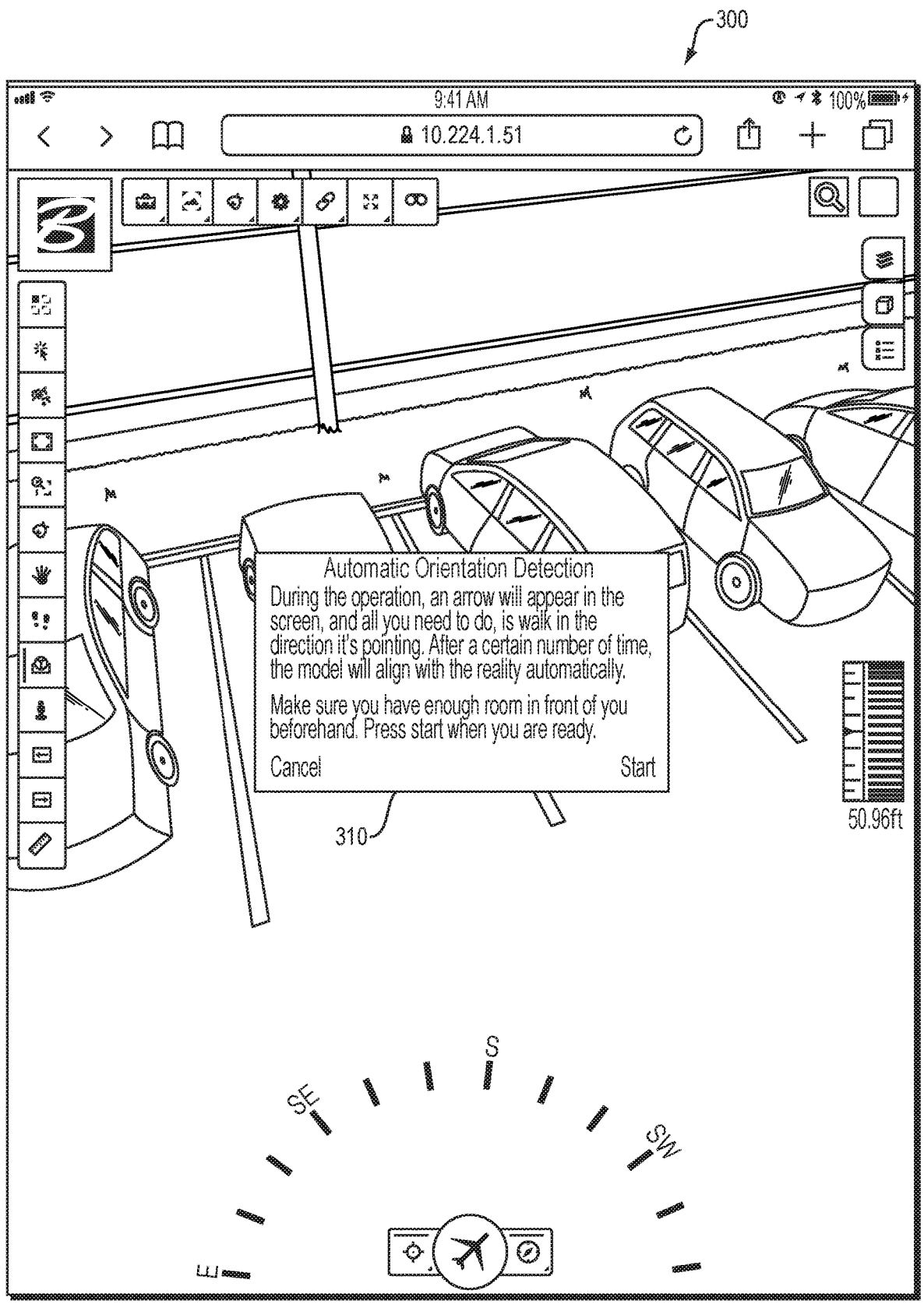
FIG. 3 is an example screenshot of the user interface of the orientation sensor alignment software process showing an introductory message.

At step 210, the orientation sensor alignment software process 126 is executed on the mobile device 100. Upon execution, the orientation sensor alignment software process 126 may display an introductory message in a user interface on the display screen 130, which explains what will be required of the user. FIG. 3 is an example screenshot 300 of the user interface of the orientation sensor alignment software process 126, showing an introductory message 310. The introductory message 310 may explain that the user will soon be required to walk forward in a straight line, and will therefore require an open space before them.

At step 220, the orientation sensor alignment software process 126 accesses an initial orientation from the orientation sensor 160 of the mobile device. Such orientation may be an initial relative orientation represented in a coordinate system of the mobile device.

Figure 4:
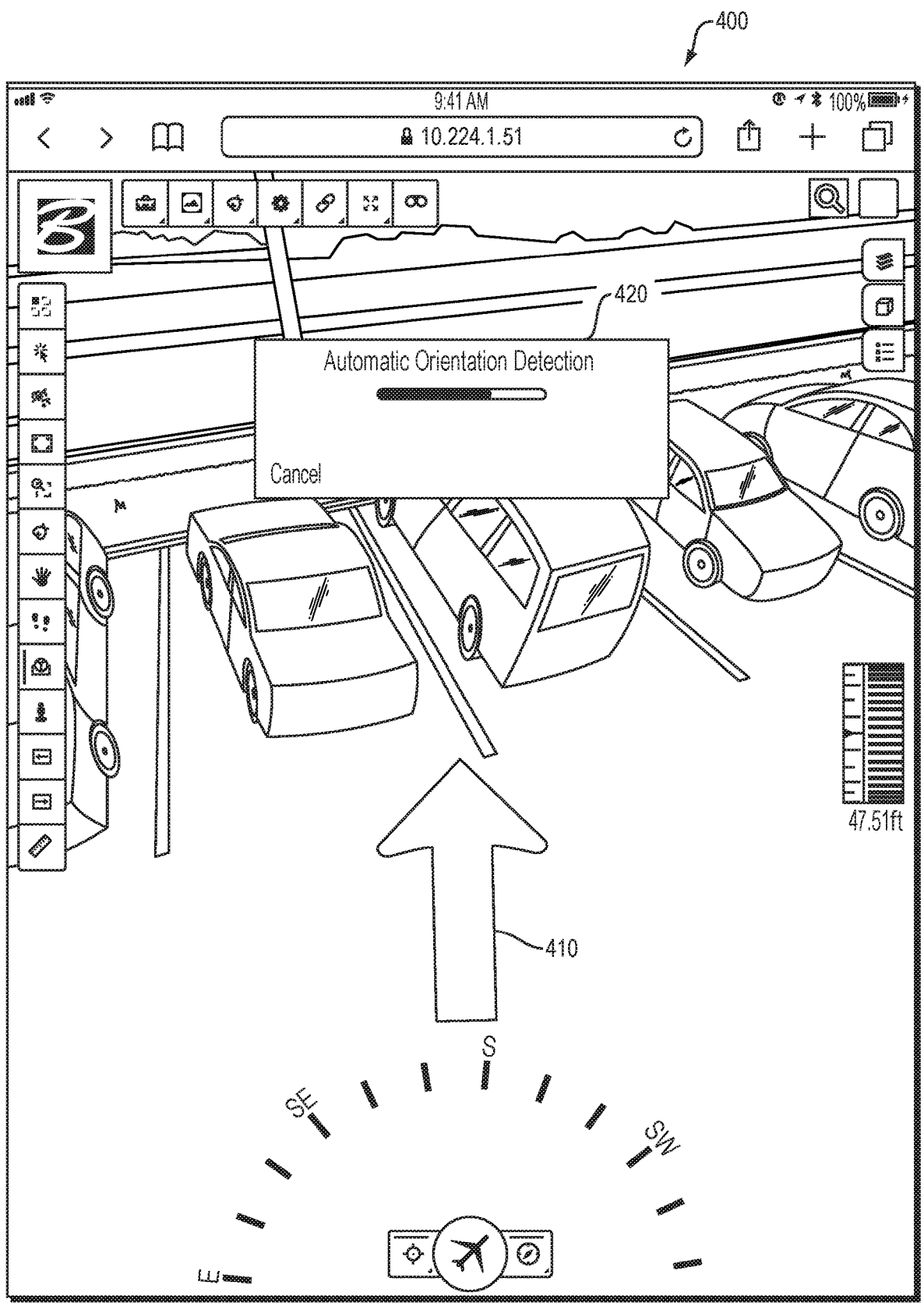
FIG. 4 is an example screenshot of the user interface of the orientation sensor alignment software process showing a movement prompt (here, an arrow)

At step 230, the orientation sensor alignment software process 126 prompts the user in the user interface on the display screen 130 to move the mobile device 100 in the direction of the initial orientation. FIG. 4 is an example screenshot 400 of the user interface of the orientation sensor alignment software process 126 showing a movement prompt (here, an arrow 410). The prompt may encourage the user to walk forward in a straight line to move the mobile device 100 in the direction of the initial orientation.

At step 240, which occurs simultaneously to step 230, the orientation sensor alignment software process 126 repeatedly determines the position of the mobile device 100, to build a set of position information 128 that describes positions of the mobile device while the mobile device is being moved in the direction. For example, the process 126 may poll the position sensor 150 (e.g., GPS receiver) at a predetermine time interval (e.g., every x seconds) while the mobile device 100 is being moved in the direction, to build the set of position information 128. Each position in the set may be represented in a two-dimensional (2-D) coordinate system with latitude and longitude values.

Steps 230 and 240 may be performed until a stopping condition is met that indicates the mobile device 100 has been moved a sufficient distance forward and a sufficient number of positions have been captured to enable alignment of orientation from the orientation sensor 160 with the Earth's coordinate system. Depending on the implementation, a number of different stopping conditions may be utilized, as discussed in more detail below. The orientation sensor alignment software process 126 may show progress towards the stopping condition in the user interface on the display screen 130. For example, referring to FIG. 4, a progress indicator 420 may be shown.

Figure 5:
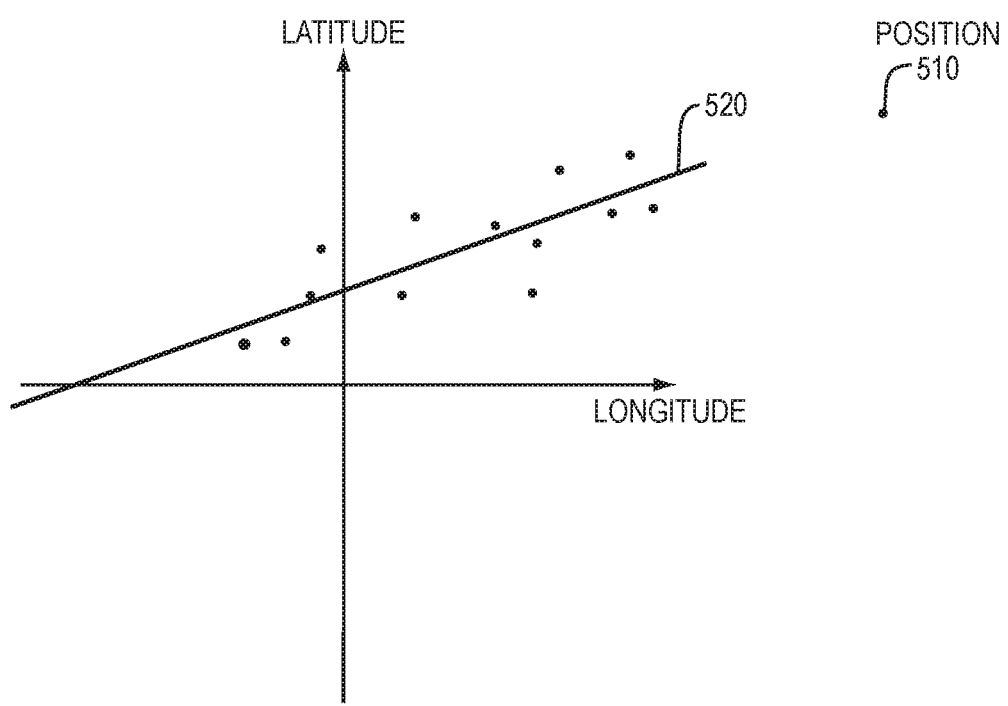
FIG. 5 is a diagram graphically depicting an example of use of a linear regression on positions of a set of position information to produce an axis of movement.

A vector of movement for the mobile device 100 may be determined based on the set of position information 128. First, an axis of movement may be determined and then a direction may be determined, the axis of movement and the direction together forming the vector. At step 250, the orientation sensor alignment software process 126 performs a linear regression on the set of position information 128 to produce an axis of movement. The axis of movement characterizes the path the mobile device 100 traveled. Any of a variety of linear regression estimation methods may be utilized, including linear least squares methods, maximum-likelihood estimation methods, ridge regression methods, least absolute deviation methods, Bayesian linear regression methods, etc. When each position is represented in a 2-D coordinate system with latitude and longitude values, a problem (i.e. a division by 0 problem) may result during calculation of the linear regression if the initial direction happens to be exactly north. In such case, the orientation sensor alignment software process 126 may switch the latitude and longitude axes of the 2-D coordinate system to avoid the problem. FIG. 5 is a diagram 500 graphically depicting an example of use of a linear regression on positions 510 of a set of position information 128 to produce an axis of movement 520. The positions 510 and axis of movement 520 are plotted on a 2-D coordinate system with axes representing latitude and longitude, respectively.

Figure 6:
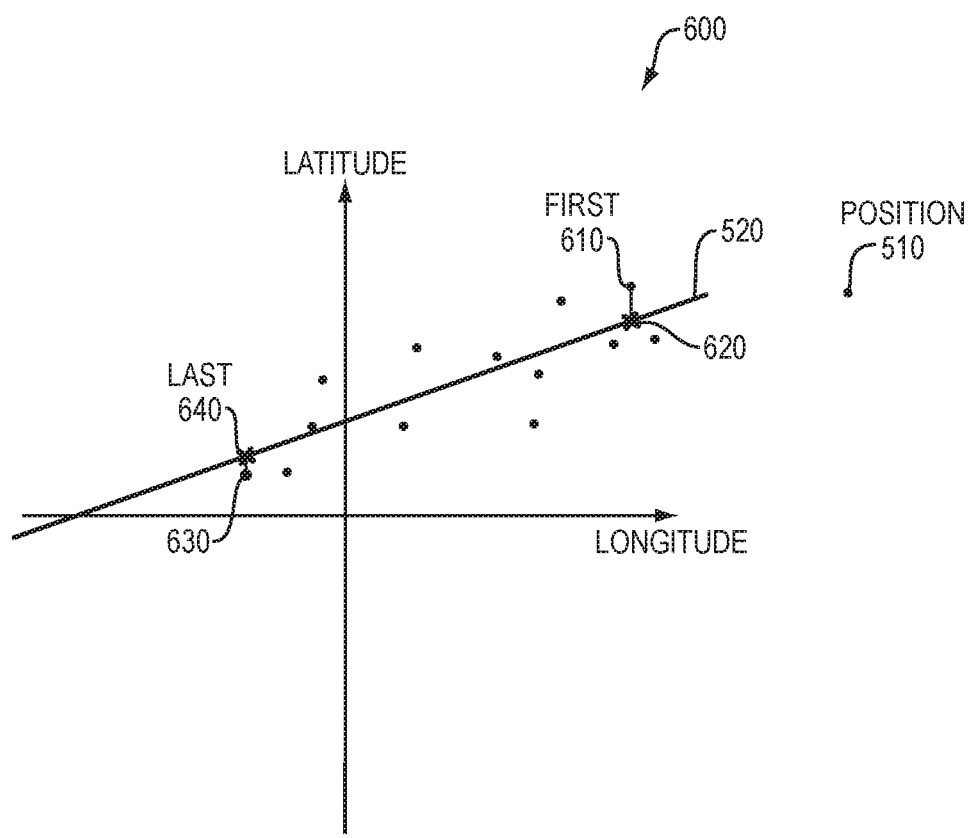
FIG. 6 is a diagram graphically depicting an example of determination of a direction along the axis of movement.

At step 260, the orientation sensor alignment software process 126 determines a direction along the axis of movement that the mobile device 100 traveled. This may be performed by projecting at least a first and a last position of the set of position information to the axis of movement to produce a starting point and ending point along the axis of movement, and then selecting the direction to be from the starting point toward the ending point. FIG. 6 is a diagram 600 graphically depicting an example of determination of a direction along the axis of movement 520. A first position 610 is projected (vertically) to the axis of movement 520 to produce a starting point 620 and the last position 630 is projected (vertically) to the axis of movement 520 to produce an ending point 640. The direction is then selected from the starting point 620 toward the ending point 640.

Figure 7:
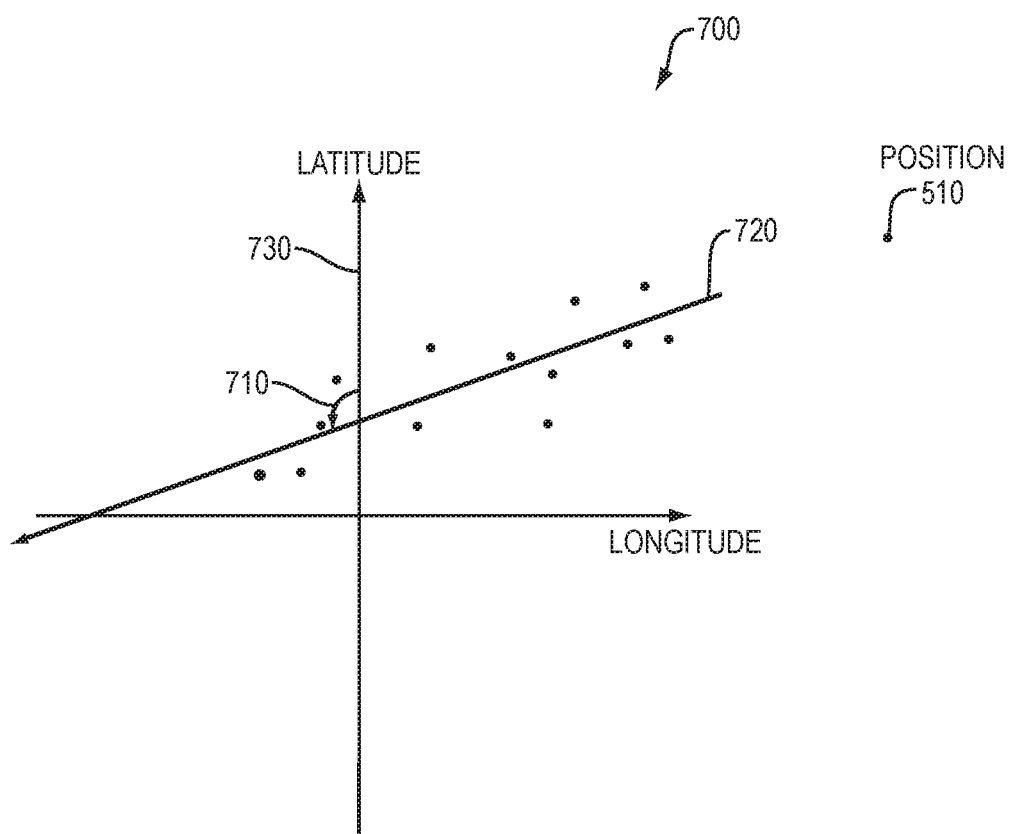
FIG. 7 is a diagram graphically depicting an example calculation of a signed angle between a vector of movement and a direction (here, north) in the Earth's coordinate system.

At step 270, the orientation sensor alignment software process 126 calculate a signed angle between the vector of movement and a direction (e.g., north) in the Earth's coordinate system. This signed angle represents a true orientation of the mobile device in the Earth's coordinate system. FIG. 7 is a diagram 700 graphically depicting an example calculation of a signed angle 710 between a vector of movement 720 and a direction (here, north) 730 in the Earth's coordinate system.

At step 280, the sensor alignment software process 126 uses the signed angle from step 270 to calculate an orientation difference between the Earth's coordinate system and the coordinate system of the mobile device 100. For example, the formula:

$$\Delta\text{Orientation} = \text{Orientation}_E - \text{Orientation}_D$$

may be used, where ΔOrientation is the orientation difference, Orientation$_E$ is the orientation of the vector of movement in the Earth's coordinate system represented by the signed angle, and Orientation$_D$ is the orientation of the vector of movement in the coordinate system of the mobile device represented by the vector of movement.

Once the orientation difference (e.g., a signed angle) has been calculated, the orientation sensor alignment software process 126 aligns the orientation sensor to enable production of absolute orientation upon demand. Absolute orientation may be produced repeatedly during a session, without re-executing the forgoing steps 210-280.

When an absolute orientation is needed by the application 124, the orientation sensor alignment software process 126 accesses a live orientation (e.g., in the coordinate system of the mobile device) from the orientation sensor 160. Then, at step 290, the orientation sensor alignment software process 126 adds the orientation difference determined in step 280 to the live orientation to produce a live absolute orientation result. For example, the formula:

$$\text{Live Orientation}_E = \text{Live Orientation}_D + \Delta\text{Orientation}$$

may be used, where Live Orientation$_E$ is the live absolute orientation of the mobile device 100 in the Earth's coordinate system, Live Orientation$_D$ is a live relative orientation of the mobile device in the coordinate system of the mobile device from the orientation sensor 160, and ΔOrientation is the orientation difference from step 280. Position from the position sensor 150 (e.g., GPS receiver) is not needed to determine the live absolute orientation. In some implementations, power savings may be achieved on the mobile device 100 by placing the position sensor 150 in a low-power state, as its output is not required once the orientation sensor 160 has been aligned. This may increase mobile device battery life, among other advantages. The position sensor may be reactivated and its output utilized when mobile device 100 is moved.

At step 295 the orientation sensor alignment software process 126 returns the live absolute orientation of the mobile device 100 to an application 124 that consumes orientation. For example, in an implementation where the application 124 is an augmented reality application, the live absolute orientation may be consumed to produce an augmented reality view displayed on the display screen 130. In the case of an augmented reality application that augments a pre-generated, physical environment-aligned 3D reality mesh, the live absolute orientation may be used to align the 3-D reality mesh with the physical environment, such that what the users sees in the 3D reality mesh corresponds to what they see in the physical environment.

As discussed above, a stopping condition is used to determine when the mobile device 100 has been moved a sufficient distance forward and a sufficient number of positions have been captured (i.e. that steps 230 and 240 can terminate). Any of a number of stopping conditions may be utilized. One stopping condition may be time. Steps 230, 240 may be executed for a fixed length of time and the set of position information 128 may be formed from the positons captured during that length of time. An advantage of a time-based stopping condition is that it provides a consistent user experience, with each alignment appearing similar to the last. A disadvantage is that distance moved by the mobile device 100 may vary due to different walking speeds of the user, which may lead to accuracy variation in the alignment. For example, if the user walks very slowly and covers only a very short distance in the fixed length of time, the set of position information 128 may produce a less accurate alignment.

Another stopping condition may be distance traveled. Steps 230, 240 may be executed until it is determined that the mobile device 100 has moved over a predetermined distance, and the set of position information 128 may be formed from the positons captured while traversing this distance. An advantage of a distance-based stopping condition is that it ensures a set of position information 128 sufficient to provide an accurate alignment. A disadvantage is that situations may occur where a user is incapable of obtaining the stopping condition. For example, if the user is in a confined space (or there are obstacles) the user may be unable to walk sufficiently far in a straight line to move the mobile device 100 the predetermined distance.

Another stopping condition may be number of positions. Steps 230, 240 may be executed until it is determined that the orientation sensor alignment software process 126 has polled the position sensor 150 (e.g., GPS receiver) a predetermined number of times and determined a predetermined number of positions. In this case, the set of position information 128 will always be the same size. An advantage of a stopping condition based on number of positions is that (provided the number is selected correctly) it ensures that there are sufficient positions for a linear regression. A disadvantage is that accuracy may be dependent on the polling interval of the position sensor 150, which may vary on different mobile devices given device-specific hardware and software constraints.

Another stopping condition may be error of estimate of the linear regression. In such case, step 250 may be executed after each position is added to the set of positions 128 and a determination made whether the current composition of the set provides an error of estimate that is less than a predetermined error threshold. If so, steps 230 and 240 may be terminated. Any of a number of error estimation functions may be utilized. In a case where the linear regression is a simple linear regression, the error may be estimated by executing the following calculation. The slope $\hat{\beta}$ of a simple linear regression may be defined as:

$$\hat{\beta} = \frac{\sum_{i=1}^{n} x_i y_i}{\sum_{i=1}^{n} x_i^2}$$

where $x_i$ are longitude positions and $y_i$ are latitude positions. The standard deviation $s_{\hat{\beta}}$ of the slope may be given as:

$$s_{\hat{\beta}} = \sqrt{\frac{\frac{1}{n-2}\sum_{i=1}^{n} \hat{\varepsilon}_i^2}{\sum_{i=1}^{n}(x_i - \bar{x})^2}}$$

Since the slope follows a Student's t-distribution, the slope may be found in this interval as:

$$\beta \in [\hat{\beta} - s_{\hat{\beta}} t_{n-2}^*, \hat{\beta} + s_{\hat{\beta}} t_{n-2}^*]$$

where t is the t-value. According, the error E may be given as:

$$E = s_{\hat{\beta}} t_{n-2}^*$$

An advantage of a stopping condition based on error of estimate of the linear regression is that it ensures a good linear regression, and in most cases an accurate alignment. A disadvantage is that, in some situations, it may cause the steps 230, 240 to run for an excessive amount of time (or even infinitely). For example, if the position sensor 150 is having difficulty producing accurate positions (e.g., due to weak GPS signals) the error threshold may be reached only after a lengthy time (or never).

Figure 8:
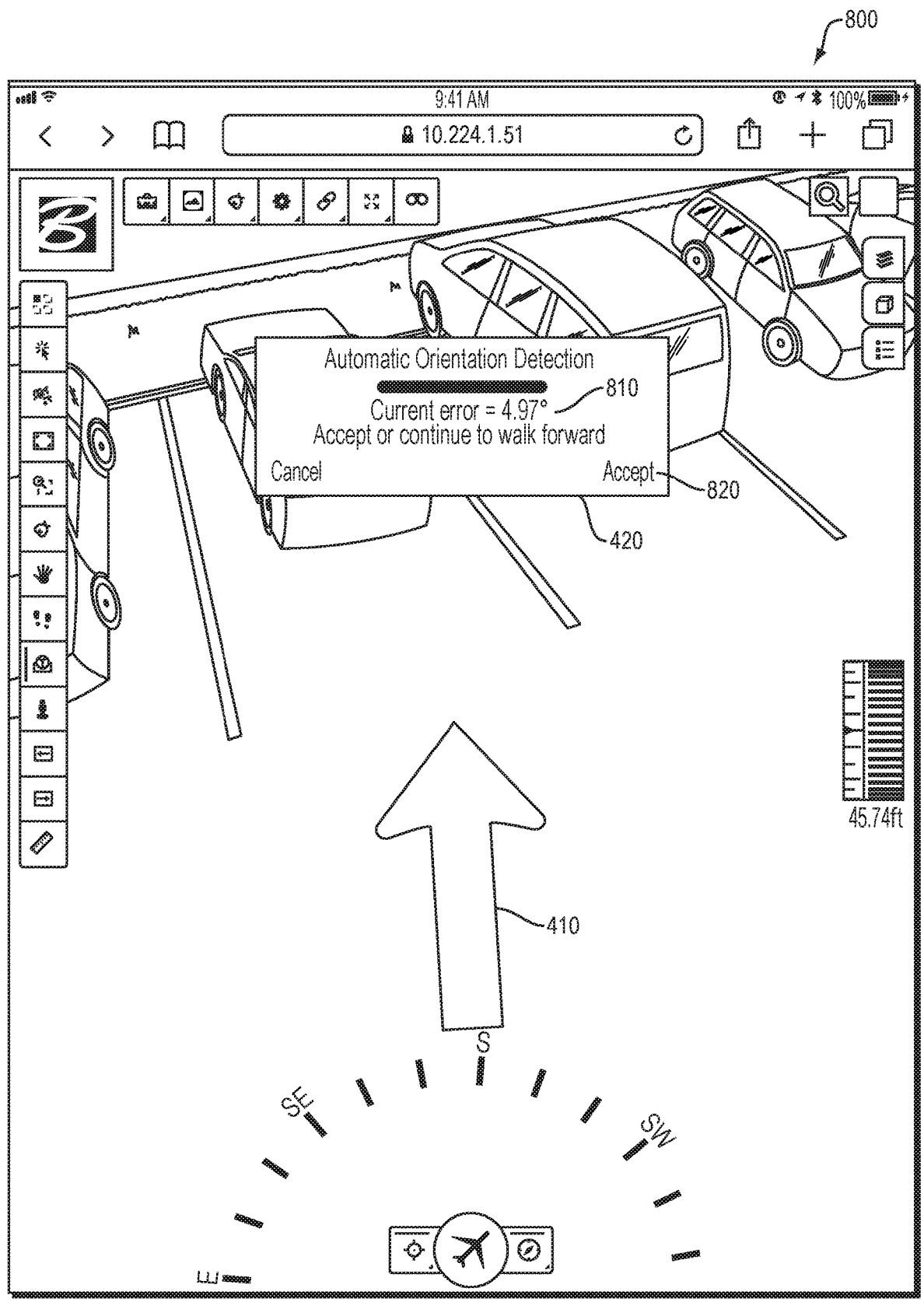
FIG. 8 is an example screenshot of the user interface of the orientation sensor alignment software process showing a measure of the error displayed as part of the progress indicator.

In addition to stopping conditions that look to one factor, hybrid stopping conditions that look to a combination of multiple factors (e.g., a combination of time, distance traveled, number of positions and error of estimate of the linear regression, etc.) may be utilized. In a preferred implementation, a stopping condition based on a combination of a number of positions and an error of estimate of the linear regression may be utilized. A minimum number of positions (e.g., 6) may be required. After the minimum number is reached, an error estimate of the linear regression may be performed. In this implementation, a measure of the error may be displayed to the user in the user interface of the orientation sensor alignment software process 126. The user may view the error estimate and choose to stop the operations of steps 230, 240 when he or she believes the error is sufficiently low. FIG. 8 is an example screenshot 800 of the user interface of the orientation sensor alignment software process 126 showing a measure of the error 810 displayed as part of the progress indicator 420. A user may select button 820 when they believe the error is sufficiently low.

In summary, techniques are described above for providing accurate absolute orientation of a mobile device 100 by aligning an orientation (e.g., a relative orientation) from an orientation sensor 160 of the mobile device 100 with the Earth's coordinate system. It should be understood that a variety of adaptations and extensions may be made to the techniques. For example, while it is discussed above that the techniques may be utilized with an augmented reality application, it should be understood that application 124 may take a variety of different forms. For example, the application 124 may be a navigation application, a mapping/surveying application, a gaming application, or other type of application. Further, it should be understood that many aspects of the techniques may be implemented in software, in hardware, or in a combination thereof. A software implementation may include electronic device-executable instructions stored in a non-transitory electronic device-readable medium, such as a volatile or persistent memory, a hard-disk, a compact disk (CD), or other storage medium. A hardware implementation may include specially configured processors, application specific integrated circuits (ASICs), and/or other types of hardware components. Further, a combined software/hardware implementation may include both electronic device-executable instructions stored in a non-transitory electronic device-readable medium, as well as one or more specially configured hardware components. Above all, it should be remembered that the above descriptions are meant to be taken only by way of example.

What is claimed is:

1. A method for providing absolute orientation of a mobile device, comprising:
   aligning an orientation sensor of the mobile device with the Earth's coordinate system by
   accessing an initial orientation of the mobile device from the orientation sensor of the mobile device, the initial orientation in a coordinate system of the mobile device,
   prompting, in a user interface displayed on a display screen of the mobile device, a user to move the mobile device in a direction of the initial orientation,
   capturing, using a position sensor of the mobile device, a set of position information that describes positions of the mobile device while the mobile device is being moved in the direction,
   based on the set of position information, determining a vector of movement of the mobile device in the Earth's coordinate system, wherein the vector of movement indicates an axis of movement along which the mobile device has moved and a direction along the axis of movement;
   calculating a difference between the vector of movement of the mobile device in the Earth's coordinate system and a vector along the initial orientation the user was prompted to move in the coordinate system of the mobile device, and using the calculated difference between the vector of movement and the vector along the initial orientation as an orientation difference between the Earth's coordinate system and the coordinate system of the mobile device;
   producing the absolute orientation of the mobile device by accessing a live orientation from the orientation sensor of the mobile device, and
   adding the orientation difference to the live orientation to produce the absolute orientation of the mobile device; and
   returning the live absolute orientation to an application executing on the mobile device.

2. The method of claim 1, wherein the determining the vector of movement of the mobile device further comprises:
   performing a linear regression on the set of position information to produce the axis of movement; and
   determining the direction along the axis of movement based on at least a first and a last position of the set of position information.

3. The method of claim 2, wherein each position in the set of position information is represented by a latitude and longitude value, and the linear regression determines the axis of movement in a two-dimensional (2-D) coordinate space having axes representing latitude and longitude.

4. The method of claim 2, wherein the prompting and capturing are performed until a stopping condition is met, the stopping condition including one or more conditions selected from the group consisting of: time, distance traveled, number of positions and error of estimate of the linear regression.

5. The method of claim 2, wherein the prompting and capturing are performed until a stopping condition is met, the stopping condition based on a combination of a number of positions and an error of estimate of the linear regression.

6. The method of claim 1, wherein the initial orientation and the live orientation are relative orientations in a coordinate system of the mobile device.

7. The method of claim 6, wherein the orientation sensor is incapable of determining absolute orientation.

8. The method of claim 6, wherein the orientation sensor is capable of determining absolute orientation but at least one of an operating system of the mobile device or intermediary software on the mobile device provides access to only relative orientation.

9. The method of claim 1, wherein the position sensor includes a global positioning system (GPS) receiver and the orientation sensor includes at least one of an accelerometer, gyroscope or magnetometer.

10. The method of claim 1, wherein the application is an augmented reality application, and the live absolute orientation is used to provide an augmented reality view on the display screen of the mobile device.

11. A non-transitory electronic device readable medium having instructions stored thereon, the instructions when executed by a processor of a mobile device operable to:
   align an orientation sensor of the mobile device with the Earth's coordinate system by
      accessing an initial orientation on the mobile device from the orientation sensor of the mobile device, the initial orientation in a coordinate system of the mobile device,
      prompting a user to move the mobile device in a direction of the initial orientation,
      determining a vector of movement of the mobile device in the Earth's coordinate system, wherein the vector of movement indicates an axis of movement along which the mobile device has moved and a direction along the axis of movement,
      calculating a difference between the vector of movement of the mobile device in the Earth's coordinate system and a vector along the initial orientation of the mobile device the user was prompted to move in the coordinate system of the mobile device, and using the calculated difference between the vector of movement and the vector along the initial orientation as an orientation difference between the Earth's coordinate system and a coordinate system of the mobile device;
   produce the absolute orientation of the mobile device by
      accessing a live orientation from the orientation sensor of the mobile device, and
      adding the orientation difference determined by the aligning to the live orientation to produce the live absolute orientation of the mobile device; and
   return the live absolute orientation to an application.

12. The non-transitory electronic device readable medium of claim 11, wherein the instructions to determine the vector of movement of the mobile device comprise instructions operable to:
   capture a set of position information that describes positions of the mobile device while the mobile device is being moved in the direction;
   perform a linear regression on the set of position information to produce the axis movement; and
   determine the direction along the axis of movement based on at least a first and a last position of the set of position information.

13. The non-transitory electronic device readable medium of claim 12, wherein each position in the set of position information is represented by a latitude and longitude value, and the linear regression determines the axis of movement in a two-dimensional (2-D) coordinate space having axes representing latitude and longitude.

14. The non-transitory electronic device readable medium of claim 12, wherein the set of position information is captured until a stopping condition is met, the stopping condition including one or more conditions selected from the group consisting of: time, distance traveled, number of positions and error of estimate of the linear regression.

15. The non-transitory electronic device readable medium of claim 12, wherein the set of position information is captured until a stopping condition is met, the stopping condition based on a combination of a number of positions and an error of estimate of the linear regression.

16. The non-transitory electronic device readable medium of claim 11, wherein the initial orientation and the live orientation are relative orientations in a coordinate system of the mobile device.

17. The non-transitory electronic device readable medium of claim 11, wherein the application is an augmented reality application, and the live absolute orientation is used to provide an augmented reality view on a display screen of the mobile device.

18. A mobile device, comprising:
   a display screen;
   an orientation sensor;
   a position sensor;
   a processor; and
   a memory coupled to the processor and configured to store instructions for an augmented reality application and an orientation sensor alignment software process that are executable on the processor, the instructions for the orientation sensor alignment software process, when executed, operable to:
      access an initial orientation of the mobile device from the orientation sensor, the initial orientation in a coordinate system of the mobile device,
      prompt, in a user interface displayed on the display screen, a user to move the mobile device in a direction of the initial orientation,
      capture, using the position sensor, a set of position information that describes positions of the mobile device while the mobile device is being moved in the direction,
      based on the set of position information, determine a vector of movement of the mobile device in the Earth's coordinate system, wherein the vector of movement indicates an axis of movement along which the mobile device has moved and a direction along the axis of movement,
      calculate a difference between the vector of movement of the mobile device in the Earth's coordinate system and a vector along the initial orientation the user was prompted to move in the coordinate system of the mobile device, and use the calculated difference between the vector of movement and the vector along the initial orientation as an orientation difference between the Earth's coordinate system and a coordinate system of the mobile device,
      access a live orientation from the orientation sensor, and
      add the orientation difference to the live orientation to produce live absolute orientation of the mobile device, and
   the instructions for the augmented reality application when executed, operable to
      use the live absolute orientation to provide an augmented reality view on the display screen.

19. The mobile device claim 18, wherein the orientation sensor is incapable of determining absolute orientation or the orientation sensor is capable of determining absolute orientation but at least one of an operating system of the mobile device or intermediary software on the mobile device provides access to only relative orientation.

20. A method for providing absolute orientation of a mobile device, comprising:

accessing an initial orientation from an orientation sensor of the mobile device, the orientation in a first coordinate system;

prompting a user to move the mobile device in a direction of the initial orientation;

capturing, using a position sensor of the mobile device, a set of position information that describes positions of the mobile device while the mobile device is being moved in the direction, the direction corresponding to the initial orientation in the first coordinate system;

based on the set of position information, determining a vector of movement of the mobile device in a second coordinate system, wherein the vector of movement indicates an axis of movement along which the mobile device has moved and a direction along the axis of movement;

calculating a difference between the vector of movement of the mobile device in the second coordinate system and vector along the initial orientation in the first coordinate system, and using the calculated difference between the vector of movement and the vector along the initial orientation as an orientation difference between the second coordinate system and the first coordinate system;

accessing a live orientation from the orientation sensor of the mobile device;

producing an absolute orientation of the mobile device by adding the orientation difference to the live orientation; and returning the live absolute orientation.

21. The method of claim 20, wherein each position in the set of position information is represented by a latitude and longitude value, and the method further comprises:

performing a linear regression on the set of position information to produce the vector of movement of the mobile device.

22. The method of claim 20, wherein the set of position information is captured until a stopping condition is met, the stopping condition including one or more conditions selected from the group consisting of: time, distance traveled, number of positions and error of estimate.

* * * * *